May 21, 1940. R. I. HUFFMAN 2,201,491
SPLIT HANDLE STRUCTURE FOR SADIRONS
Filed Feb. 13, 1939
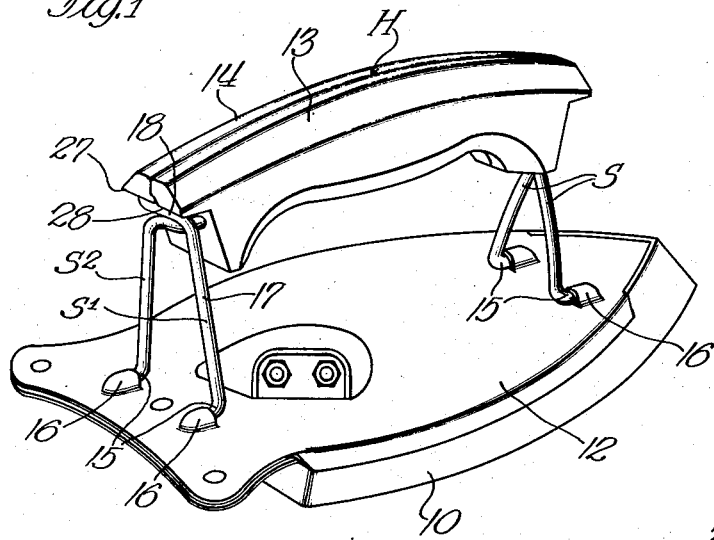
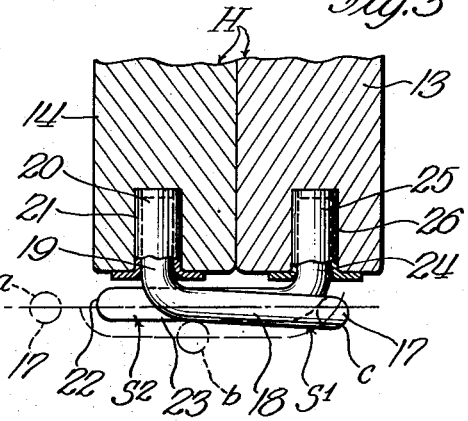
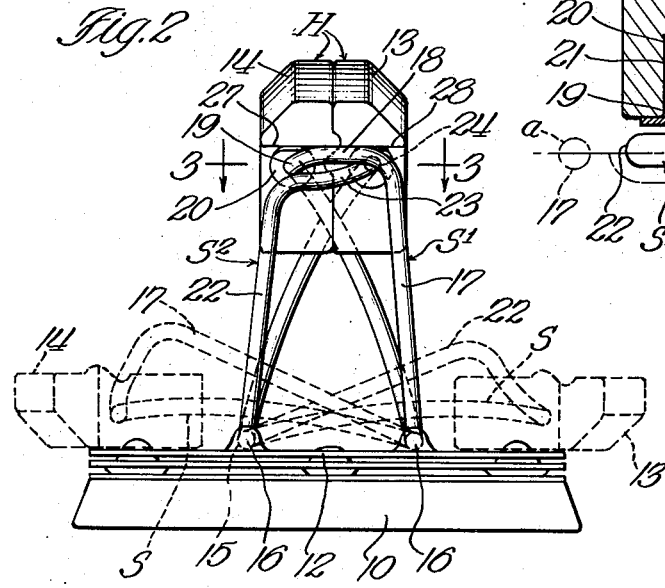
INVENTOR.
Russell I. Huffman
BY Bair & Freeman
ATTORNEYS Patented May 21, 1940

2,201,491

UNITED STATES PATENT OFFICE 2,201,491

SPLIT HANDLE STRUCTURE FOR SADIRONS

Russell I. Huffman, Dover, Ohio, assignor to Knapp-Monarch Company, St. Louis, Mo., a corporation of Missouri Application February 13, 1939, Serial No. 256,196

8 Claims. (Cl. 38—90)

An object of my present invention is to provide a split handle structure for sadirons of the general type shown in my Patent No. 2,147,036, issued February 14, 1939, the present invention being an improvement thereover particularly with respect to means to retain the handle in level position against tipping after it is brought up to ironing position.

Another object is to provide means for supporting a pair of handle elements of a sadiron or the like so that they can cooperate with each other to form a single handle member during ironing operations, or be swung downwardly to a position for making a comparatively flat package out of the sadiron so that it can be readily stored for transportation, the supports for the handle elements and the handle member itself so coacting with each other that the handle is held rigidly against clockwise and counterclockwise rotation when the handle elements are brought up to handle forming position.

More particularly, it is my object to provide handle supports which have upright portions, lateral portions and pintle portions, the pintle portions being pivoted in the handle elements and the handle supports cooperating with each other and also a shoulder on the handle member to effect the desired elimination of rocking movement of the handle when in its upper position for ironing operations.

Still a further object is to provide the handle supports so formed that they coact with each other to lock the handle elements together in handle member forming position.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly I have illustrated a preferred and desirable embodiment of the invention in the accompanying drawing, in which Figure 1 is a perspective view of a split handle structure for sadirons and the like embodying my invention;

Figure 2 is a rear elevation thereof showing the handle in raised position for ironing, and showing by dotted lines its lowered position for transportation, and Figure 3 is an enlarged sectional view on the line 3—3 of Figure 2 illustrating the coaction of the handle supports with each other to lock the handle elements in their upper handle forming position.

On the accompanying drawing, I have used the reference numeral 10 to indicate generally a sole plate and 12 a cover plate of a sadiron. A handle member H is provided for the sadiron and consists of a pair of handle elements 13 and 14.

Handle supports S are provided at the front of the handle H and supports S1 and S2 are provided at the rear thereof. Each handle support has a pintle portion 15 at its lower end pivotally mounted in bearings 16 formed on the cover plate 12.

The handle supports S are of the general type shown in my copending application hereinbefore referred to while the handle supports S1 and S2 are of particular shape and have peculiar cooperation with each other and with the handle H, in accordance with my present invention. The handle support S1 includes an upright portion 17, a lateral portion 18 and a pintle portion 19. The pintle portion 19 is pivotally received in a sleeve-like thimble 20 inserted in a socket 21 formed in the handle element 14. Likewise the handle support S2 comprises an upright portion 22, a lateral portion 23 and a pintle portion 24. The pintle portion 24 is also received in the thimble 25 located in a socket 26 of the handle element 13.

The handle H is provided with a shoulder indicated at 27 and 28, the portion 27 thereof being formed on the handle element 14 and the portion 28 on the handle element 13. When the parts are in raised position, as shown in Figure 2, it will be noted that the lateral portion 18 of the handle support S1 engages the shoulder 27—28 throughout a substantial portion thereof. This prevents any possibility of clockwise rotation of the handle H.

Counterclockwise rotation of the handle H is prevented by the lateral portion 23 of the handle support S2 engaging the lower surface of the pintle 19. The engagement between 27—28 and 18 and between 23 and 19 thus eliminates the possibility of one of the pintles 19 and 24 being elevated relative to the other one. In this way the handle H is held rigidly against pivotal movement when in position for operation, although pivotal movement of the handle elements relative to their supports is permitted when the handle elements are swung downwardly to the folded position shown by dotted lines in Figure 2.

As the handle elements are swung toward each other to their handle member forming position, the upright portion 17 of the handle support S2 will follow the path indicated at a, b and c in Figure 3. This is due to the way the handle supports are formed and to the fact that they are formed of metal and are therefore somewhat resilient. The position a is the normal position assumed by the upright element 17. Upon striking the bend between the pintle 19 and the lateral portion 18 of the support S1, the element 17 will be sprung out to the position b and pass along the lateral portion 18 and finally snap over the bend between the lateral portion 23 and the pintle 24 of the handle support S2. This will serve to lock the handle elements in handle forming position and constrain them to remain in such position as the lateral portion 18 is under tension.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention.

I claim as my invention and desire to secure by Letters Patent of the United States:

1. In a split handle structure for sadirons, a handle member comprising a pair of handle elements, supports for each handle element pivoted to a sadiron and to the handle elements and means to prevent pivotal movement of the handle elements in one direction relative to the supports when said handle elements are engaged with each other to form a handle member, said means comprising a shoulder on said handle member, one of said handle supports having a portion extending along said shoulder and engaging a substantial portion thereof.

2. In a handle structure for sadirons and the like, a pair of handle elements, supports for each handle element pivoted to a sadiron or the like and to the handle element, and a shoulder on each of said handle elements, one of said handle supports having a portion extending along said shoulders and engaging a substantial portion thereof to prevent pivotal movement of said handle elements in one direction relative to said supports when said handle elements are positioned relative to the sadiron for use.

3. In a handle structure for sadirons and the like, a handle member comprising a pair of handle elements, supports therefor comprising a supporting element for each end of each handle element, two of said supporting elements at one end of said handle member crossing each other and having pintles, said handle elements having sockets to receive said pintles and permit pivotal movement of the handle elements relative to the supporting elements, said handle member having a shoulder, one of said two supporting elements having a portion engaging said shoulder to prevent rotation of the handle member in one direction when said handle elements are positioned together to form a handle member, and the other of said two supporting elements engaging the pintle of said first supporting element on the side thereof opposite said shoulder to prevent rotation of said handle member in the other direction.

4. In a split handle structure, a handle member comprising two handle elements, supports therefor comprising a supporting element for each end of each handle element, two of said supporting elements at one end of said handle members crossing each other and having pintles pivoted to said supporting elements, said handle elements having shoulders which are substantially aligned with each other when said handle elements are positioned together for operation, one of said two supporting elements having a portion engaging said shoulders to prevent rotation of the handle elements in one direction, and the other of said two supporting elements engaging the pintle of said first supporting element on the side thereof opposite said shoulder to prevent rotation of said handle elements in the other direction.

5. In a structure of the character disclosed, a sadiron or the like, a handle therefor comprising a handle member formed of two handle elements, said handle member having a shoulder, a support for each handle element, said handle elements being pivoted relative thereto and said supports being pivoted relative to said sadiron or the like and means to prevent rotation of said handle elements when positioned together to form a handle member comprising a portion of one of said supports engaging a portion of the other and a portion of one of them engaging said shoulder so that one pivotal connection of said supports to said handle is retained against elevation relative to the other one.

6. In a structure of the character disclosed, a sadiron or the like, a handle therefor comprising a handle member formed of two handle elements, a support element for each handle element, said handle elements having pivotal connection therewith and said supporting elements being pivoted relative to said sadiron or the like and means to prevent rotation of said handle elements when positioned together to form a handle member comprising a portion of each of said supporting elements engaging each other and a portion of one of said supporting elements engaging said handle member so that one of said pivotal connections is retained against elevation relative to the other one.

7. In a handle structure for sadirons and the like, a handle member formed of two handle elements, a supporting element for each of said handle elements, each of said supporting elements having an upright portion, a substantially horizontally extending portion adjacent the upper end thereof and a pintle portion, the ends of said handle elements receiving said pintle portions, the lower ends of said upright portions being pivoted relative to a sadiron or the like, said handle member having a shoulder with which one of said horizontally extending portions engages and the other horizontally extending portion engaging the pintle portion of the first supporting element to retain said handle member against rotation either clockwise or counterclockwise when said handle elements are positioned adjacent each other in handle forming position.

8. In a structure of the character disclosed, a sadiron or the like, a handle therefor comprising two handle elements, a support for each handle element, each of said supports having an upright portion and a substantially horizontally extending portion adjacent the upper end thereof, said handle elements being pivoted to said supports and said supports being pivoted to the sadiron, said handle elements having shoulders with which one of said horizontally extending portions engages and the other horizontally extending portion engaging the first support to retain said handle member against clockwise and counterclockwise rotation relative to said supports.

RUSSELL I. HUFFMAN.